United States Patent
Wang et al.

(10) Patent No.: US 6,407,160 B2
(45) Date of Patent: *Jun. 18, 2002

(54) NON-AQUEOUS COMPOSITE WAX PARTICLE DISPERSION

(75) Inventors: Yongcai Wang, Penfield; James L. Bello, Rochester; Janglin Chen, Rochester; Dwight W. Schwark, Rochester, all of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,469

(22) Filed: Dec. 28, 1998

(51) Int. Cl.[7] .............................................. C08L 91/06
(52) U.S. Cl. ........................ 524/763; 524/276; 524/277; 524/279; 524/487; 524/488; 524/489; 524/490; 524/458; 524/700
(58) Field of Search ................................ 524/700, 763, 524/276, 277, 279, 458, 487, 488, 489, 490

(56) References Cited

U.S. PATENT DOCUMENTS

| | | | |
|---|---|---|---|
| 3,696,067 A | 10/1972 | Trofimow | |
| 3,979,352 A | * 9/1976 | Brady et al. | 526/263 X |
| 3,997,488 A | * 12/1976 | Tsubuko et al. | 260/28.5 A |
| 4,203,769 A | 5/1980 | Guestax | |
| 4,276,209 A | * 6/1981 | Petersen et al. | 428/378 |
| 4,569,896 A | 2/1986 | Perez et al. | |
| 4,612,279 A | 9/1986 | Steklenski et al. | |
| 4,735,976 A | 4/1988 | Steklenski et al. | |
| 4,766,059 A | 8/1988 | Vandenabeele et al. | |
| 4,873,281 A | * 10/1989 | Maska | 524/457 |
| 5,034,454 A | 7/1991 | Maska et al. | |
| 5,384,226 A | * 1/1995 | Kanakura et al. | 430/137 |
| 5,395,877 A | 3/1995 | Pucknat et al. | |
| 5,695,919 A | 12/1997 | Wang et al. | |
| 5,834,545 A | * 11/1998 | Batty et al. | 524/276 |

FOREIGN PATENT DOCUMENTS

| | | |
|---|---|---|
| EP | 659783 A | 6/1995 |
| EP | 688793 A | 12/1995 |
| EP | 694597 A | 1/1996 |

* cited by examiner

*Primary Examiner*—Judy M. Reddick
(74) *Attorney, Agent, or Firm*—Doreen M. Wells

(57) ABSTRACT

The present invention relates to a polymer particle having a wax phase and a second phase. The wax phase includes a wax having a melting point of greater than 30° C. and comprising greater than 80% by weight of the wax phase. The second phase, free of ionic charge groups, includes a mono-alpha, beta-ethylenically unsaturated monomer free of ionic charge groups capable of addition polymerization to form a water soluble homopolymer including from 1 to 40% by weight of the second phase and a mono-alpha, beta-ethylenically unsaturated monomer capable of addition polymerization to form a water insoluble homopolymer.

14 Claims, No Drawings

NON-AQUEOUS COMPOSITE WAX PARTICLE DISPERSION

CROSS REFERENCE TO RELATED APPLICATIONS

This application relates to commonly assigned copending application Ser. Nos. 09/221,639; 09/221,083; 09/221,470; 09/221,465; 09/221,776; 09/221,883; and 09/221,516 filed simultaneously herewith and now U.S. Pat. Nos. 6,048,679, 6,075,090, 6,187,521, 6,048,677, 6,174,661, 6,177,239 and 6,048,678, respectively. These copending applications are incorporated by reference herein.

FIELD OF THE INVENTION

This invention relates in general to a composite wax particle capable of dispersing in organic solvent media and providing a coated layer with superior physical characteristics.

BACKGROUND OF THE INVENTION

Waxes have widely been used in a surface coated layer to impart an article with improved barrier properties, anti-blocking properties, rub and mar resistance, controlled releasing properties, slip and lubricity, and water repellency. For example, waxes have been used as a surface finish on candies, chocolate bars, chewing gums and similar products; as an additive in polishes on furniture, leather, floor, automobile and fruits, as pharmaceutical coating on pills, as a component in creams and lipsticks, as an additive in plastic film emulsions, carbon papers and inks, paints and varnishes, mold releases, metal casting, laminated cartons, water-proof compounds, and the like. To enhance the performance of the coated layer, for example, higher moisture impermeability and surface water repellency, superior surface lubricity and mar resistance, etc., it is highly desirable to include in the coated layer relatively high loadings or concentrations of wax. However, a high enough wax concentration to render the subsequent coating superior with physical characteristics results in coating compositions, especially non-aqueous coating compositions, which are highly unstable and very difficult to manufacture.

Aqueous wax dispersions of colloidal sizes (0.01 to 5 micron, typically in the range of from 0.01 to 1 micron) are generally known. Non-aqueous wax dispersions of colloidal sizes are difficult to prepare. Wax can be compounded into viscous non-aqueous media (viscosity greater than, for example, 1000 cps) by mechanical force. The problem with such an approach is that the particle size is difficult to predict and more difficult to reproduce. The resultant dispersions are not truly colloidal dispersions and on dilution wax particles will settle down or precipitate out.

Waxes are insoluble in most organic solvents, especially in polar organic solvents. Coatings can be made using highly toxic solvents such as propylene dichloride, which is on EPA P/U highly hazardous list.

It is well know in the art to incorporate wax in latex formulations. U.S. Pat. No. 4,569,896 teaches the production of a toner composition that includes resin particles of styrene methacrylate copolymer grafted or containing a low molecular weight wax plus a second resin composed of a terpolymer of styrene, acrylate and acrylonitrile. The developer also contains magnetite particles and carbon black. U.S. Pat. No. 5,034,454 describes the preparation of a crosslinkable water-dispersible acrylic copolymer wherein the polymerization is conducted in an organic solvent in the presence of a wax. The polymerization includes about 1 to 15 weight percent of a wax. U.S. Pat. No. 5,395,877 describes a process for the production of fortified vinyl latex rich in wax copolymerizing in an organic solvent in the presence of a wax under conditions to produce a low molecular weight resin. The copolymer is treated with ammonium hydroxide or aqueous alkali and used as a cosurfactant in a second aqueous emulsion polymerization of vinyl monomers to produce the fortified vinyl latex. U.S. Pat. No. 4,766,059 describes a method of making solid spherical beads having a mean size ranging from about 0.5 to about 20 microns. The polymer beads contain a polymeric resinous material and a water insoluble wax. The process of making such solid beads involves the use of water miscible or immiscible low boiling solvent to dissolve both polymeric materials and wax, and subsequently removal of the solvent or solvent mixture by evaporation. This requires large processing equipment and lengthy processing time, which increases the expenses. U.S. Pat. No. 5,695,919 describes a lubricant impregnated core/shell polymer particle, the polymer particle comprising a core portion which is insoluble in the organic medium and a shell portion which has an affinity for both the core portion and the organic medium. However, when the procedure is used to prepare a polymer shell containing a nonionic water soluble vinyl monomer, the resultant particle completely loses its affinity toward any organic solvent medium.

Support materials for an imaging element often employ auxiliary layers comprising glassy, hydrophobic polymers such as polyacrylates, polymethacrylates, polystyrenes, or cellulose esters, for example. One typical application for such an auxiliary layer is as a backing layer to provide resistance to abrasion, scratching, blocking, and ferrotyping. Such backing layers may be applied directly onto the support material, applied onto a priming or "subbing" layer, or applied as an overcoat for an underlying layer such as an antistatic layer, transparent magnetic layer, or the like. For example, U.S. Pat. No. 4,203,769 describes a vanadium pentoxide-containing antistatic layer that is overcoated with a cellulosic layer applied from an organic solvent. U.S. Pat. Nos. 4,612,279 and 4,735,976 describe organic solvent-applied layers comprising a blend of cellulose nitrate and a copolymer containing acrylic acid or methacrylic acid that serve as overcoats for antistatic layers.

Frequently, when the auxiliary layer serves as the outermost layer, as is the case for a backing layer, it is desirable for this layer to have a low coefficient of friction (COF) to provide proper conveyance properties and to protect the imaging element from mechanical damage during the manufacturing process or customer use. It is known to protect imaging elements against mechanical damage by coating them with a layer comprising a lubricant such as a wax. However, it has proven difficult to provide a single layer applied from organic medium that comprises both an abrasion-resistant polymer and a lubricant since it is difficult to find a coating medium that dissolves both the polymer and the lubricant and is at the same time attractive from an enviromental and health standpoint. In addition, it is difficult to form a stable dispersion of a lubricant such as a wax in an organic medium that may be added to a coating composition containing a dissolved, abrasion-resistant polymer. Therefore, in order to form a backing layer which can be applied from liquid organic medium that is both abrasion-resistant and has a low coefficient of friction one often applies two separate layers; a first layer which is comprised of an abrasion-resistant polymer and then a second layer which is comprised of a lubricant such as a wax. The need to apply these two separate layers increases both manufacturing complexity and cost.

It is an objective of the present invention to provide a wax particle which forms very stable dispersions in commonly used organic solvents at room temperature, which is compatible with film forming binders and various coating addenda, and which is highly effective in improving coating physical characteristics.

SUMMARY OF THE INVENTION

The present invention is a polymer particle which includes a wax phase containing a wax having a melting point of greater than 30° C. and a polymer phase. The wax in the wax phase contains greater than 80% by weight of the wax phase. The polymer phase is composed of a mono-alpha, beta-ethylenically unsaturated monomer free of ionic charge groups capable of addition polymerization to form a water soluble homopolymer and a mono-alpha, beta-ethylenically unsaturated monomer capable of addition polymerization to form a water insoluble homopolymer. The mono-alpha, beta-ethylenically unsaturated monomer free of ionic charge groups capable of addition polymerization to form a water soluble homopolymer constitutes from 1 to 40% by weight of the polymer phase.

DETAILED DESCRIPTION OF THE INVENTION

The composite wax particles of the present invention have a wax phase composed of greater than 80% by weight of a wax having a melting point of greater than 30° C. and a non-crosslinked polymer phase containing from 1 to 40% by weight of a polymerizable mono-alpha, beta-ethylenically unsaturated compound free of ionic charge groups and capable of addition polymerization to form a water soluble homopolymer. The composite wax particle contains from 10 to 95% by weight of the wax phase and preferably has a mean size smaller than 1 micron. The composite wax particle is from 10 to 95% by weight of the wax phase and has a mean size smaller than 1 micron. Wax useful for the practice of the invention has been described, for example, in references such as "The Chemistry and Technology of Waxes", A. H. Warth, $2^{nd}$ Ed., Reinhold Publishing Corporation, New York, N.Y., 1956, and "Plastics Additives and Modifiers Handbook", Chapter 54–59, J. Edenbaum (Ed.), Van Nostrand Reinhold, New York, N.Y., 1992. Suitable waxes include hydrocarbon and/or ester-containing waxes, e. g. animal waxes such as beewax, plant waxes, such as carnauba wax, paraffin waxes, microcrystalline waxes, Fischer-Tropsch waxes, polyethylene waxes, polypropylene waxes, and a mixture thereof.

The composite wax particle of the invention is readily dispersible in organic solvent media, has good compatibility with film forming polymers and various coating addenda, and is useful for the preparation of a coated layer with superior physical characteristics.

The composite wax particle of the present invention is preferably prepared by polymerizing a vinyl monomer mixture in the presence of pre-formed aqueous wax particles. The vinyl monomer mixture comprises at least two polymerizable mono-alpha, beta-ethylenically unsaturated compounds wherein from 1 to 40% of the said compounds are free of ionic charge groups and capable of addition polymerization to form a water soluble homopolymer and at least one of the said compounds is substantially water insoluble and capable of addition polymerization to form a water insoluble homopolymer.

Pre-formed aqueous wax dispersion (or emulsion) is primarily composed of wax particles, dispersants/surfactants, and water. The dispersants can be nonionic, anionic, and cationic, and can be polymeric and are used at levels as high as 20% of the wax. Wax particles can be formed by various methods known in the art. For example, they can be prepared by pulverizing and classifying dry waxes or by spray drying of a solution containing waxes followed by redispsersing the resultant particles in water using a dispersant; They can be prepared by a suspension technique which consists of dissolving a wax in, for example, a water immiscible solvent, dispersing the solution as fine liquid droplets in aqueous solution, and removing the solvent by evaporation or other suitable techniques; They can be prepared by mechanically grinding a wax material in water to a desired particle size in the presence a dispersant, heating the wax particles dispersed in water to above their melting point, and cooling the melted particles in water to form a stable wax emulsion.

In the present invention, the pre-formed aqueous wax dispersions are formed by the so-called "atmospheric emulsification" and pressure emulsification" techniques. Atmospheric process is used to prepare wax dispersions for waxes with melting points below the boiling point of water. The process typically consists of melting wax and surfactant together, and optionally a base is added to the melt. Hot water is then slowly added to the wax melt with vigorous agitation (water to wax). Wax emulsion can also be formed by adding molten wax/surfactant blend to boiling water with vigorous agitation. Pressure emulsification is generally needed for wax with m.p. greater than 100° C. It is similar to the process described above except at temperatures above the water boiling point. Vessels capable of withstanding high pressures are normally used.

Ethylenically unsaturated monomers which are free of ionic charge groups and capable of addition polymerization to form a water soluble homopolymer may include, for example, (meth)acrylamides such as acrylamide, methacrylamide, N,N-dimethyl acrylamide, N-methylol acrylamide, and isopropyl acrylamide, poly(ethylene glycol) (meth)acrylates, N-vinyl-2-pyrrolidone, hydroxyl ethyl methacrylate, hydroxyl ethyl acrylate, vinyl methyl ether, and the like. Ethylenically unsaturated monomers which are substantially water insoluble and capable of addition polymerization to form a water insoluble homopolymer may include virtually all monomers capable of undergoing addition polymerization in emulsion polymerization to produce polymers free of ionic charge groups and essentially water-insoluble. Typical useful monomers thus include, for example, methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate acrylonitrile, methacrylonitrile, vinyl acetate, vinyl propionate, vinylidene chloride, vinyl chloride, styrene, t-butyl styrene, vinyl toluene, butadiene, isoprene, and the like. The polymerization reaction involved in the present invention is initiated and maintained with an initiating agent or catalyst, which is very similar to those used in conventional emulsion polymerization. Most useful catalysts for the practice of the present invention are azo and diazo compounds, for example, azobisisobytyronitrile and azobiscyanovaleric acid. The amount of the initiators employed follows generally the practice in conventional emulsion polymerization. In general, the amounts can vary within the range of about 0.2 to 3 or 4 weight percent or possibly higher by weight of the total monomers. It is generally recognized that higher levels of initiators tends to result in lowered molecular weight for the ultimate polymers. If the polymerization is carried out in multiple stages, the amount of initiators in the beginning or initiating stage is adjusted to match the proportion of the monomer then present, and further initiators are fed during the delayed feed stage to correspond to the delayed feed of the monomers. Basically, in any case, the initiators are supplied as needed to maintain the reaction in smooth and easily controlled conditions. Surfactants that can be used in the present invention icnlude, for example, a sulfate, a sulfonate, a cationic compound, an amphoteric compound, and a polymeric protective colloid. Specific examples are described in "McCUTCHEON'S Volume 1: Emulsifiers & Detergents, 1995, North American Edition". Chain transfer agents may also be used to control the properties of the polymer particles formed.

Generally speaking, the reaction conditions employed in the execution of the present method parallel those utilized in conventional emulsion polymerization as regards such variables as temperature, time, agitation, equipment, etc. The reaction temperature can be maintained at a constant value or can vary from 50° to 80° or 90° C. If the reaction temperature varies, the starting temperature is usually around 50° to 55° C., and as the reaction proceeds exothermically, the temperature rises.

The time of the reaction is difficult to predict since it will depend upon other variables, such as the amount of initiating agent introduced, the reaction temperature, etc. If the amount of monomer is small, the reaction may be finished within about an hour but with larger amounts the reaction will usually continue for 3 to 4 hours. About ½ to 1 hour of post-heating stage after all monomer has been added can be used to insure that the polymerization has gone to completion and no free monomer is present. The sequence of addition of the various ingredients is not critical and can be varied. Usually, aqueous medium is first added to the reactor, then aqueous wax dispersion, and monomer in that order, all being added while the medium is thoroughly agitated, followed by the initiators, but other sequences are possible.

In one of the preferred embodiments of the invention, the involves polymerization process in the presence of pre-formed aqueous wax particles is carried out sequentially (see, for example, Padget, J. C. in Journal of Coating Technology, Vol 66, No. 839, pages 89 to 105, 1994). In this process, the polymerization is conducted in a monomer-starved manner.

The copolymer contained in the composite wax particles of the invention is properly designed to have good "bonding" with the wax phase and good compatibility in the solvent medium. Defining compatibility of the copolymer in the solvent medium can be achieved by using the concept of "polymer solubility map" (see, for example, Ramsbothan, J. in Progress in Organic Coatings, Vol 8, pages 113–141, 1980; and Wicks, Jr. Z. W., Jones, F. N., and Papas, S. P. in Organic Coatings, pages 229–239, 1992, John Wiley & Sons, Inc.). As the organic Solvents, any of the solvents customarily used in coating compositions may be satisfactorily used.

Since the polymer contained in the composite wax particle of the invention must be soluble in the non-aqueous medium it is necessary that the polymer is firmly bound either physically or chemically to the wax phase. Otherwise the polymer may be dissolved away from the wax phase and the composite wax particles would lose its stability. Chemical bonding can be achieved by grafting of the polymer to the wax phase. One of the mechanisms may involve abstraction of hydrogen from the wax molecule by free radical present in the system, giving active centers onto which the polymer chain may grow.

Although the polymer phase consisting of non-crosslinked polymers, the polymers may carry in addition to the polymerizable group a chemically functional group wherein the non-crosslinked polymers are rendered crosslinkable by an external crosslinking agent and can be crosslinked after the application to a substrate of a coating compostion into which the composite wax particles are incorporated.

The composite wax particles of the invention may be incorporated directly into a coating composition, the main film forming constituent of which is compatible with the composite wax particles. Alternatively, the composite wax particles may be first isolated from the aqueous dispersion, for example, by spray drying, and then be incorporated into a liquid coating composition as a dry powder. As a further alternative, the composite wax particles thus isolated may be blended into a powder coating composition.

The imaging elements of this invention can be of many different types depending on the particular use for which they are intended. Details with respect to the composition and function of a wide variety of different imaging elements are provided in U.S. Pat. No. 5,300,676 and references described therein. Such elements include, for example, photographic, electrophotographic, electrostatographic, photothermographic, migration, electrothermographic, dielectric recording and themal-dye-transfer imaging elements. Layers of imaging elements other than the image-forming layer are commonly referred to as auxiliary layers. There are many different types of auxiliary layers such as, for example, subbing layers, backing layers, interlayers, overcoat layers, receiving layers, stripping layers, antistatic layers, transparent magnetic layers, and the like.

Support materials for an imaging element often employ auxiliary layers comprising glassy, hydrophobic polymers such as polyacrylates, polymethacrylates, polystyrenes, or cellulose esters, for example. One typical application for such an auxiliary layer is as a backing layer to provide resistance to abrasion, scratching, blocking, and ferrotyping. Such backing layers may be applied directly onto the support material, applied onto a priming or "subbing" layer, or applied as an overcoat for an underlying layer such as an antistatic layer, transparent magnetic layer, or the like. For example, U.S. Pat. No. 4,203,769 describes a vanadium pentoxide-containing antistatic layer that is overcoated with a cellulosic layer applied from an organic solvent. U.S. Pat. Nos. 4,612,279 and 4,735,976 describe organic solvent-applied layers comprising a blend of cellulose nitrate and a copolymer containing acrylic acid or methacrylic acid that serve as overcoats for antistatic layers.

In a particularly preferred embodiment, the imaging elements of this invention are photographic elements, such as photographic films, photographic papers or photographic glass plates, in which the image-forming layer is a radiation-sensitive silver halide emulsion layer. The thickness of the support is not critical. Support thickness of 2 to 10 mil (0.06 to 0.30 millimeters) can be used. The supports typically employ an undercoat or subbing layer well known in the art that comprises, for example, for polyester support a vinylidene chloride/methyl acrylate/itaconic acid terpolymer or vinylidene chloride/acrylonitrile/acrylic acid terpolymer. The emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly(vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the elements of the present invention can contain auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in Research Disclosure, Item 36544, September, 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chlorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in Research Disclosure, Item 36544, September, 1994, and the references listed therein.

The photographic silver halide emulsions utilized in this invention can contain other addenda conventional in the photographic art. Useful addenda are described, for example, in Research Disclosure, Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The following examples are used to illustrate the present invention. However, it should be understood that the invention is not limited to these illustrative examples.

EXAMPLES

Examples 1–8

Preparation of the Composite Wax Particles of the Invention

A stirred reactor containing 438.3 g of Michemlube 160 (25% solids, from Michelman, Inc.) was heated to 85 deg. C. and purged with $N_2$ for 2 hour. 0.365 g of azobisisobutyronitrile in 10 g of toluene was then added to the reactor. An emulsion containing 109.6 g of deionized water, 32.9 g of 10% by weight Triton X100 surfactant, 9.1 g of a 10% by weight sodium dodecyl sulfonate surfactant, 87.7 g of methyl methacrylate, 21.9 g of vinyl pyrrolidone, and 0.18 g of azobisisobutyronitrile was added continuously for 2 hours. The reaction was allowed to continue for 4 more hours before the reactor was cooled down to room temperature. The composite wax particle dispersion prepared was filtered through glass fiber to remove any coagulum.

The resultant composite wax particle dispersion has a solid of about 31%. The particle contains about more than 40% by weight of carnauba wax, about 50% by weight of poly(methyl methacrylate-co-vinyl pyrrolidone) (MMA/VP 80/20) with the balance being the amount of stabilizers/dispersants used. The composite wax particle is designated as Wax-1.

Composite wax particles Wax-2 to Wax-7 were prepared in a similar manner. Their compositions and other parameters are listed in Table 1.

TABLE 1

| Example | Wax Particle | Copolymer Composition |
| --- | --- | --- |
| Example 1 Wax-1 | ML160 (130 nm) From Michelman, Inc. | Poly(methyl methacrylate-co-vinyl pyrrolidone) 80/20 |

TABLE 1-continued

| Example | Wax Particle | Copolymer Composition |
|---|---|---|
| Example 2 Wax-2 | ML160 (130 nm) From Michelman, Inc | Poly(methyl methacrylate-co-vinyl pyrrolidone) 60/40 |
| Example 3 Wax-3 | ML160 (130 nm) From Michelman, Inc | Poly(methyl methacrylate-co-vinyl pyrrolidone) 90/10 |
| Example 4 Wax-4 | ML160 (130 nm) From Michelman, Inc | Poly(methyl methacrylate-co-vinyl pyrrolidone) 95/5 |
| Example 5 Wax-5 | ML160 (130 nm) From Michelman, Inc | Poly(methyl methacrylate-co-hydroxyethyl methacrylate) 87.5/12.5 |
| Example 6 Wax-6 | ML160 (130 nm) From Michelman, Inc | Poly(methyl methacrylate-co-N,N-dimethyl acrylamide) 90/10 |
| Example 7 Wax-7 | ML160 (130 nm) From Michelman, Inc | Poly(methyl methacrylate-co-poly(ethylene glycol)methacrylate Mn = 360) 85/15 |

Examples 8

Transfer of the Composite Wax Particles to a Non-aqueous Medium

The composite wax particles prepared in Examples 1–6 were directly added, respectively, to acetone, THF, acetone/methanol (65/35, 50/50), and isobutyl alcohol/methylene chloride (65/35. 50/50, 35/65), with stirring at room temperature. The final concentration was about 5% by weight. The dispersions prepared are stable for more than a week. The composite wax particle prepared in Example 7 was directly added, respectively, to THF and acetone at 1% by weight with stirring. Nice looking and stable dispersions were obtained.

Comparative Examples 9

The following examples show that coating compositions comprising the composite wax particles of the invention provide transparent films with excellent frictional characteristics (i.e., low coefficient of friction values) even when incorporated at extremely low levels. Example 10 was prepared from a coating composition consisting of Wax-1 of the invention Example 1 in an acetone/methanol solvent mixture. The coating composition had excellent solution stability and gave a transparent, dry layer when applied onto a cellulose acetate substrate at a dry coverage of 50 mg/m$^2$. The coefficient of friction as measured by the method set forth in ANSI IT 9.4-1992 is about 0.1. Example 11 was prepared from a coating composition comprising a mixture of Wax-1 with a solution polymer (cellulose diacetate) in an acetone/methanol solvent mixture. Again the coating solution had excellent stability and gave a transparent, dry layer when applied onto cellulose acetate substrate. The total coating dry coverage was about 360 mg/m$^2$ and the dry coverage of Wax-1 was about 70 mg/m$^2$. The coefficient of friction as measured by the method set forth in ANSI IT 9.4-1992 is about 0.1. The composite wax particles of the invention are capable of providing a coated layer with superior surface lubricity at extremely low dry coverage.

The invention has been described in detail with particular reference to certain preferred embodiments thereof, but it will be understood that variations and modifications can be effected within the spirit and scope of the invention.

What is claimed is:

1. A polymer particle comprising:
   a wax phase comprising a wax having a melting point of greater than 30° C. said wax comprising greater than 80% by weight of the wax phase; and
   a polymer phase comprising a mono-alpha, beta-ethylenically unsaturated monomer free of ionic charge groups capable of addition polymerization to form a water soluble homopolymer, and a mono-alpha, beta-ethylenically unsaturated monomer capable of addition polymerization to form a water insoluble homopolymer wherein the polymer phase is free of ionic charge groups and comprises 1 to 40% by weight of the mono-alpha, beta-ethylenically unsaturated monomer free of ionic charge groups capable of addition polymerization to form the water soluble homopolymer.

2. The polymer particle of claim 1 comprising a mean size smaller than 1 micron.

3. The polymer particle of claim 1 wherein the wax phase comprises from 10 to 95% by weight of polymer particle.

4. The polymer particle of claim 1 wherein the wax phase further comprises dispersants, surfactants or water.

5. The polymer particle of claim 1 wherein the wax comprises animal waxes, plant waxes, paraffin waxes, microcrystalline waxes, Fischer-Torpsch waxes, polyethylene waxes or polypropylene waxes.

6. The polymer particle of claim 1 wherein the mono-alpha, beta-ethylenically unsaturated monomer free of ionic charge groups capable of addition polymerization to form a water soluble homopolymer comprises (meth)acrylamides, poly(ethylene glycol)(meth)acrylates, N-vinyl-2-pyrrolidone, hydroxyl ethyl methacrylate, hydroxyl ethyl acrylate or vinyl methyl ether.

7. The polymer particle of claim 1 wherein the mono-alpha, beta-ethylenically unsaturated monomer capable of addition polymerization to form a water insoluble homopolymer comprises methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, t-butyl styrene, vinyl toluene, butadiene or isoprene.

8. The polymer particle of claim 1 wherein the mono-alpha, beta-ethylenically unsaturated monomer free of ionic charge groups capable of addition polymerization to form a water soluble homopolymer comprises vinyl pyrrolidone and the mono-alpha, beta-ethylenically unsaturated monomer capable of addition polymerization to form a water insoluble homopolymer comprises methyl methacrylate.

9. The polymer particle of claim 1 wherein the mono-alpha, beta-ethylenically unsaturated monomer free of ionic charge groups capable of addition polymerization to form a water soluble homopolymer comprises hydroxyethyl methacrylate and the mono-alpha, beta-ethylenically unsaturated monomer capable of addition polymerization to form a wate nsoluble homopolymer comprises methyl methacrylate.

10. The polymer particle of claim 1 wherein the mono-alpha, beta-ethylenically unsaturated monomer free of ionic charge groups capable of addition polymerization to form a water soluble homopolymer comprises N,N-dimethyl acrylamide and the mono-alpha, beta-ethylenically unsaturated monomer capable of addition polymerization to form a water insoluble homopolymer comprises methyl methacrylate.

11. The polymer particle of claim 1 wherein the mono-alpha, beta-ethylenically unsaturated monomer free of ionic charge groups capable of addition polymerization to form a water soluble homopolymer comprises poly(ethylene glycol)methacrylate and the mono-alpha, beta-ethylenically unsaturated monomer capable of addition polymerization to form a water insoluble homopolymer comprises methyl methacrylate.

12. A polymer particle comprising:

a wax phase comprising a wax and dispersants, surfactants or water, said wax having a melting point of greater than 30° C. and comprising greater than 80% by weight of the wax phase; and a polymer phase comprising a mono-alpha, beta-ethylenically unsaturated monomer free of ionic charge groups capable of addition polymerization to form a water soluble homopolymer comprising (meth)acrylamides, poly(ethylene glycol)K(meth)acrylates, N-vinyl-2-pyrrolidone, hydroxyl ethyl methacrylate, hydroxyl ethyl acrylate or vinyl methyl ether, and a mono-alpha, beta-ethylenically unsaturated monomer capable of addition polymerization to form a water insoluble homopolymer comprising methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, t-butyl styrene, vinyl toluene, butadiene or isoprene wherein the polymer phase is free of ionic charge groups and comprises 1 to 40% by weight of the mono-alpha, beta-ethylenically unsaturated monomer free of ionic charge groups capable of addition polymerization to form the water soluble homopolymer.

13. The polymer particle of claim 1 wherein a wax phase to polymer phase ratio is greater than 40/60 and less than 90/10.

14. The polymer particle of claim 1 wherein a wax phase to polymer phase ratio is greater than 50/50 and less than 90/10.

* * * * *